United States Patent [19]
Nowell

[11] 3,829,755
[45] Aug. 13, 1974

[54] SEQUENCER FOR A MULTIPLE SWITCHING REGULATOR

[75] Inventor: John R. Nowell, Phoenix, Ariz.

[73] Assignee: Honeywell Information Systems Inc., Waltham, Mass.

[22] Filed: Apr. 5, 1973

[21] Appl. No.: 348,571

[52] U.S. Cl. ............... 321/2, 307/247, 321/18, 321/19, 321/44
[51] Int. Cl. ........................................ H02m 3/22
[58] Field of Search ........... 307/247, 260, 262, 275; 321/2, 18, 19, 43, 44, 45 C

[56] References Cited
UNITED STATES PATENTS

| | | |
|---|---|---|
| 3,573,597 | 4/1971 | Genuit et al. ................ 321/2 |
| 3,603,866 | 9/1971 | Opal ........................ 321/45 R |
| 3,697,853 | 10/1972 | Nowell et al. ................ 321/2 |
| 3,707,684 | 12/1972 | Nowell ........................ 330/9 |
| 3,728,558 | 4/1973 | Genuit et al. ................ 321/2 X |

Primary Examiner—William M. Shoop, Jr.
Attorney, Agent, or Firm—Lloyd B. Guernsey

[57] ABSTRACT

The sequencer employs a variable current source, a Schmidt trigger circuit, a one-shot, a pair of master-slave flip-flops and logic gates to provide pulses for operating a multiple switching regulator. A logic gate disables the sequencer to prevent the generation of pulses while a portion of the switching regulator is delivering current to an output terminal and thereby prevents possible damage to the switching regulator.

8 Claims, 6 Drawing Figures

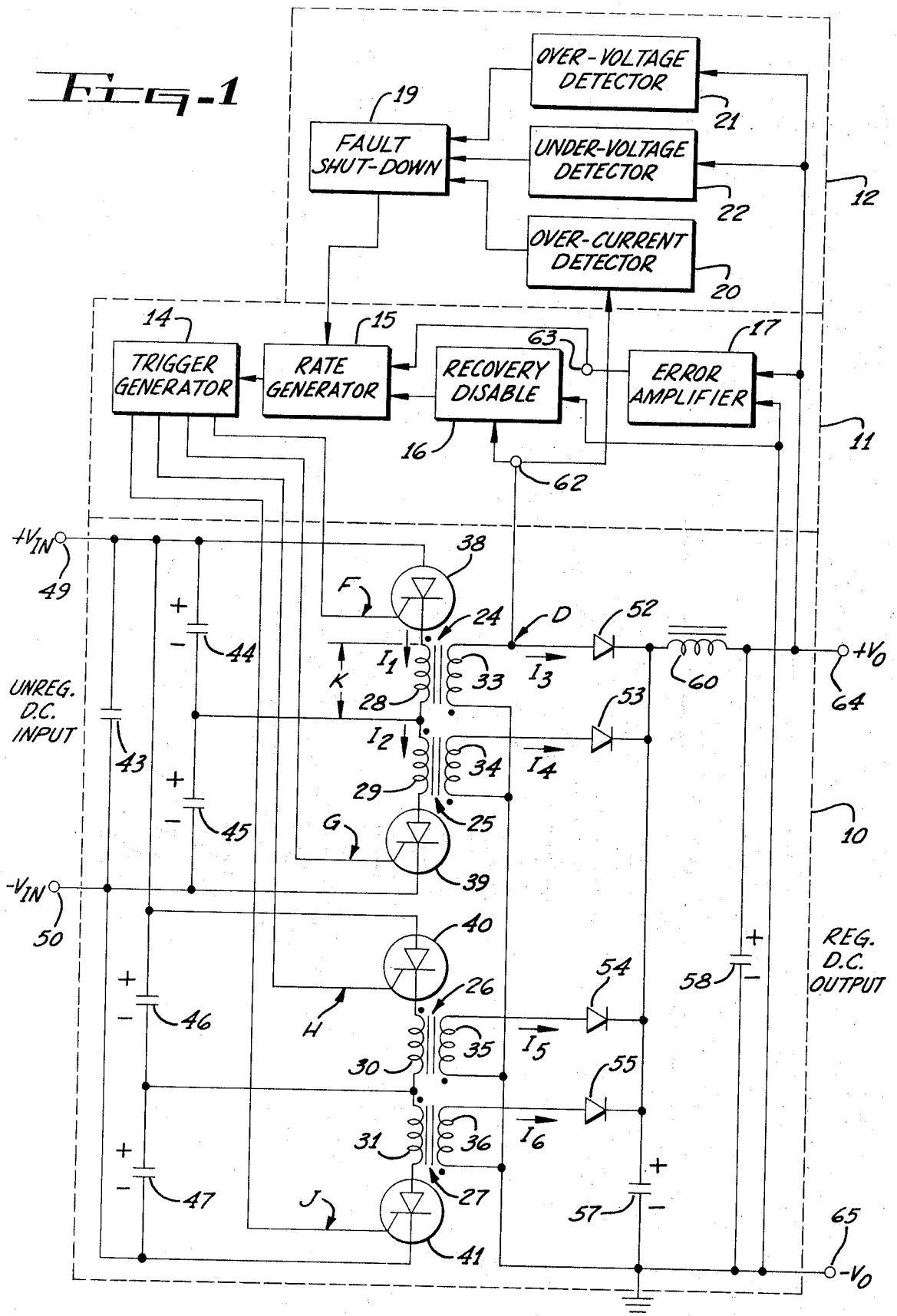

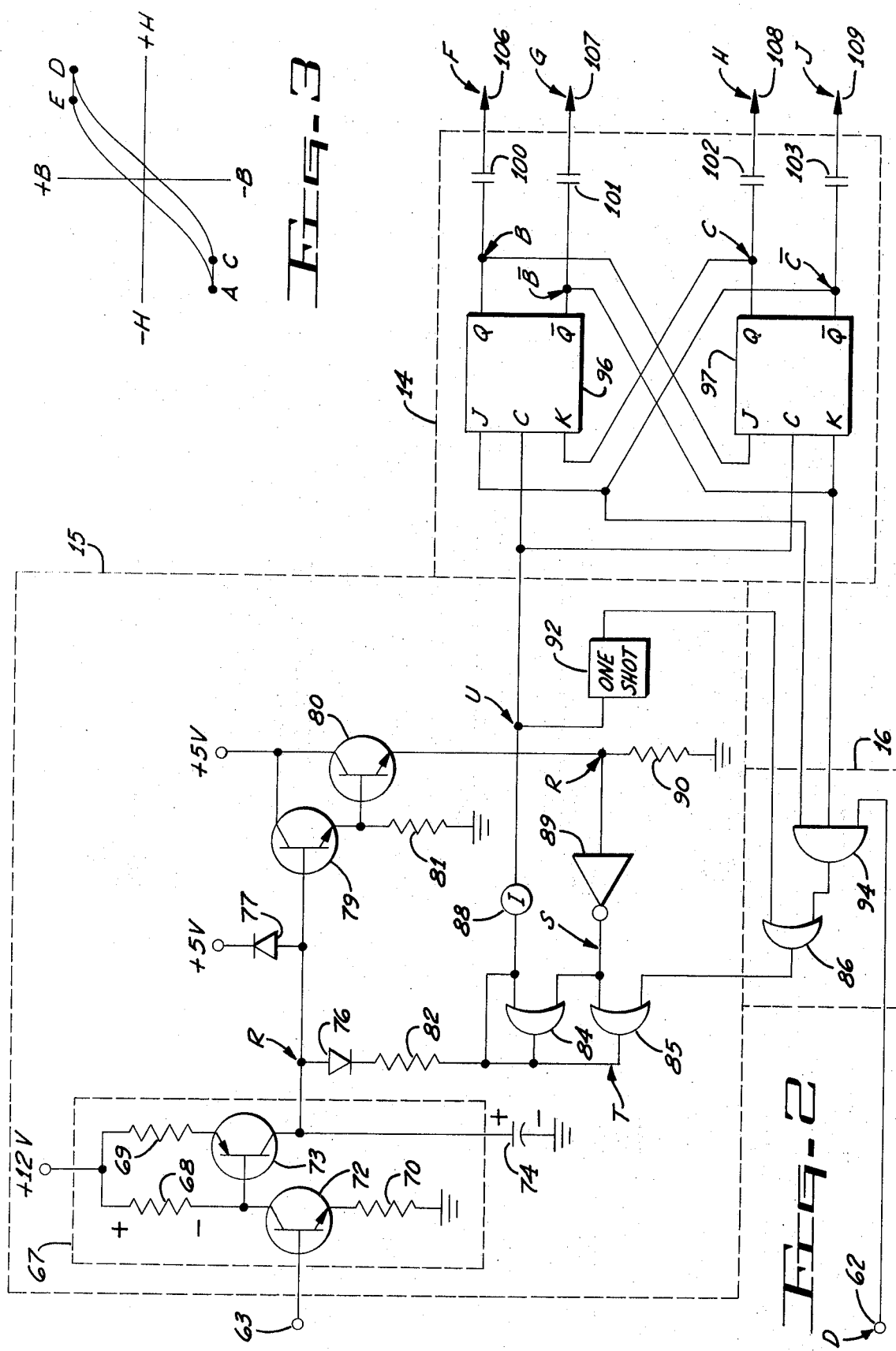

SEQUENCER FOR A MULTIPLE SWITCHING REGULATOR

CROSS-REFERENCE TO RELATED APPLICATIONS

A detailed description of the operation of the error amplifier may be found in the U.S. Pat. No. 3,707,684 by John R. Nowell, entitled "Error Amplifier for Use with a Switching Regulator." A more detailed description of the operation of the switching regulator can be found in the U.S. Pat. No. 3,573,597, by Luther L. Genuit and John R. Nowell, issued Apr. 6, 1971, entitled "High Current Switching Regulator with Overlapping Current Output Pulses."

BACKGROUND OF THE INVENTION

This invention relates to a sequencer for a multiple switching regulator and more particularly to a sequencer which uses a variable current source, a Schmidt trigger circuit, a one-shot, a pair of master-slave flip-flops and logic gates to provide pulses for operating the multiple switching regulator. A logic gate disables the sequencer to prevent the generation of pulses while a portion of the switching regulator is delivering current to an output terminal and thus prevents possible damage to portions of the switching regulator.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reducing the length of cables which distributes the current to the circuits and reduces the amount of error signals which may be caused by variations in voltage in long cables.

The switching regulator may employ a pair of transformers, a pair of silicon controlled rectifiers and a source of signals to convert an unregulated D.C. voltage, such as 150 volts, to an accurately regulated voltage such as one volt. The silicon controlled rectifiers are employed as switches between the source of unregulated D.C. voltage and the transformers. The silicon controlled rectifiers are located on the "high" voltage side of the transformer where the current and power losses in these rectifiers are low, thereby causing the switching regulator to have a high degree of efficiency. The regulated D.C. voltage obtained from the secondary windings on the transformers is supplied to a pair of voltage output terminals. The transformers provide isolation between the regulated D.C. voltage and the source of unregulated D.C. voltage so that a short circuit in the silicon controlled rectifier will not cause damage to the microcircuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and cathode when a pulse of current flows into the gate, the silicon controlled rectifier "fires," i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual," 4th Edition, 1967, published by the General Electric Company, Syracuse, New York.

A signal source is coupled to the voltage output terminal of the switching regulator and develops trigger signals whose frequency is determined by the value of voltage between the voltage output terminals. The trigger signals are coupled to the silicon controlled rectifiers in the switching regulator and cause these rectifiers to deliver energy through the transformers to output filter capacitors which are connected to the voltage output terminals. The signal source senses any change in the value of any regulated output voltage and causes a change of frequency in the trigger signals delivered to the switching regulator.

The signal source includes an error amplifier, a rate generator and a trigger generator. The error amplifier develops a current having a value which is determined by the voltage at the output terminals of the switching regulator. This current is applied to the rate generator which develops pulses having a frequency which is determined by the value of current from the error amplifier. The pulses from the rate generator are applied to the trigger generator which develops trigger signals which are applied to the gates of the silicon controlled rectifiers in the switching regulator.

Rate generators include an oscillator and a circuit which disables the oscillator during the time that all of the secondary windings of the transformers in the switching regulators are delivering current to the output filter capacitors. If the oscillator were to deliver a pulse to the switching regulator while all of the secondary windings are delivering current to the filter capacitors, current in one of the silicon controlled rectifiers could increase very rapidly and cause damage to the rectifier. What is needed is a circuit which prevents the oscillator from generating a pulse while the rectifier is conducting.

When the values of current which are required in a portion of a data processing system is greater than can be delivered by a single switching regulator two or more switching regulators may be connected in parallel to provide the required current. In some prior art systems each of the switching regulators use a separate control circuit which includes an error amplifier, a rate generator, and a trigger generator. This causes a power supply to be relatively bulky and expensive. Slight differences in the values of components used in the different control circuits may cause one of the switching regulators to deliver more current than is delivered by the other regulators. This may cause damage to components in the regulator which delivers the larger value of current. What is needed is a circuit where a single error amplifier, a single rate generator and a trigger generator can be used to control the operation of more than one switching regulator. Other prior art systems used a single unijunction transistor oscillator to provide pulses for operating a dual switching regulator. The unijunction transistor oscillator is limited in the frequency which it can develop and is useful with only one or two sections of switching regulators. The present invention uses a variable current source, a capacitor, a Schmidt trigger circuit, master-slave flip-flops and logic gates to provide pulses which can operate several sections of switching regulators.

It is, therefore, an object of this invention to provide a multiple switching regulator having a single control circuit.

Another object of this invention is to provide a multiple switching regulator having a sequencer which causes a plurality of silicon controlled rectifiers to sequentially deliver energy through transformers to a voltage output terminal.

A further object of this invention is to provide a sequencer having a timer which inhibits the generation of pulses while any of the silicon controlled rectifiers in the regulators are conducting.

Still another object of this invention is to provide a sequencer having a circuit which inhibits the generation of pulses while all of the secondary windings of the switching regulator are delivering current to the output terminals, but is ready to produce a pulse as soon as one of the transformer windings stops delivering current.

A still further object of this invention is to provide a sequencer which develops pulses having a frequency which is determined by the value of the voltage at the output terminal of the switching regulators.

Another object of this invention is to provide a sequencer for a multiple switching regulator which causes each of the silicon controlled rectifiers in the switching regulator to deliver substantially the same amount of current as each of the other silicon controlled rectifiers in the dual switching regulators.

Still another object of this invention is to provide a sequencer which can operate over a wide range of frequencies.

Another object of this invention is to provide a sequencer which can control the operation of a larger number of silicon controlled rectifiers in a multiple switching regulator.

SUMMARY OF THE INVENTION

The foregoing objects are achieved in the present invention by providing a new and improved sequencer for use with a multiple switching regulator. The sequencer includes a variable current source, a Schmidt trigger circuit, a capacitor, a one-shot, a pair of master-slave flip-flops and logic gates. The value of current delivered by the current source determines the rate of charge of the capacitor and determines the frequency of pulses delivered by the sequencer. The logic gates prevent generation of pulses while all of the transformers in the multiple sequencer are delivering current to the output terminals.

Other objects and advantages of this invention will become apparent from the following descriptions when taken in connection with the accompanying drawings.

BRIEF DESCRIPTION OF THE DRAWINGS

FIG. 1 is a schematic drawing of a dual switching regulator and its associated control circuits including the present invention;

FIG. 2 is a schematic drawing of an embodiment of the present invention;

FIG. 3 illustrates a magnetization curve which is useful in explaining the operation of the circuit shown in FIG. 1;

DESCRIPTION OF THE PROPOSED EMBODIMENT

Figure 4:
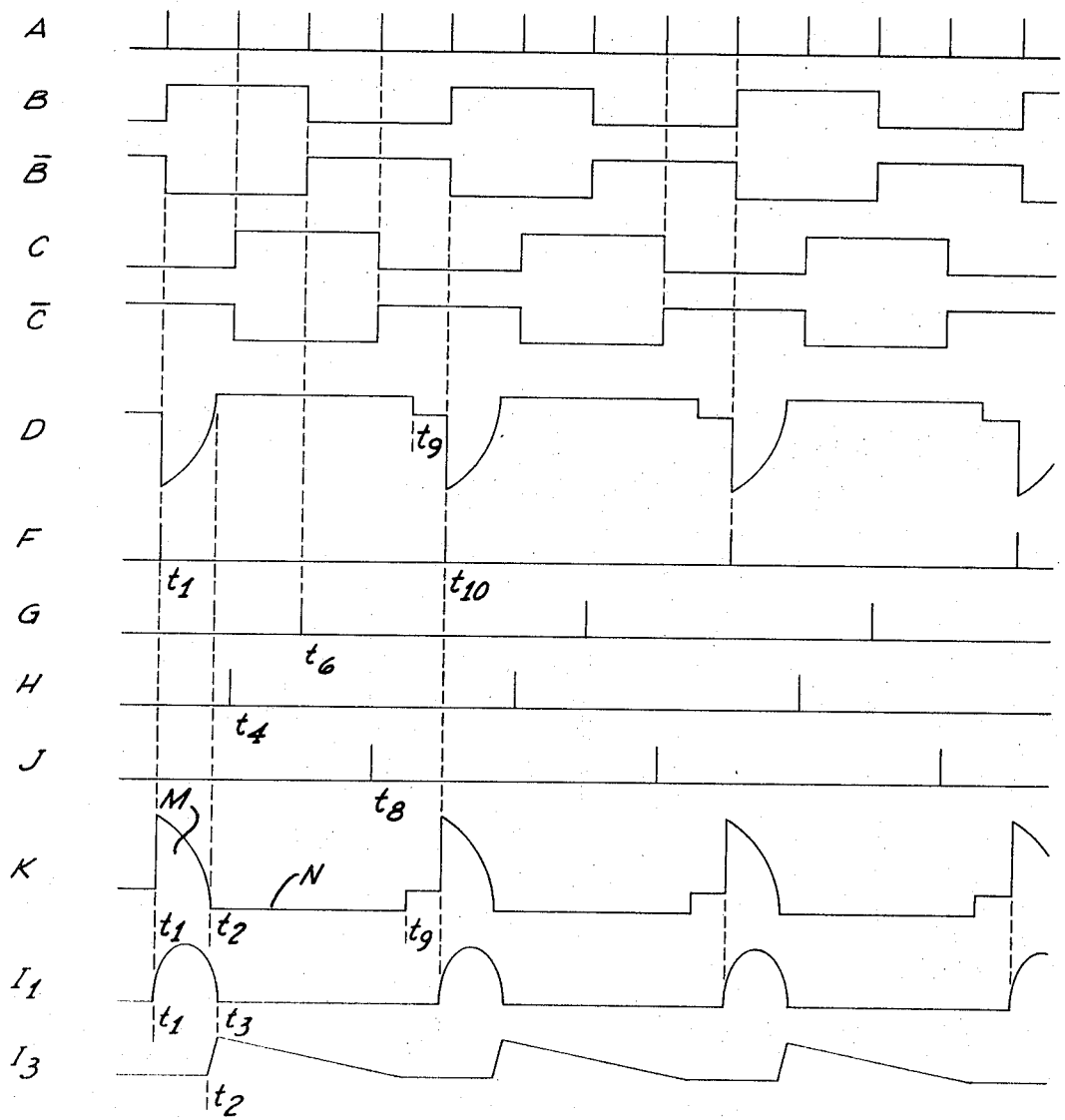
FIGS. 4, 5a and 5b illustrate waveforms which are useful in explaining the operation of the present invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a dual switching regulator 10, a switching regulator control circuit 11 for providing trigger signals to switching regulator 10, and a circuit 12 for monitoring the current and voltage delivered by the power supply. The switching regulator control circuit 11 comprises a counter and trigger generator 14, a rate generator 15, a recovery disable circuit 16 and an error amplifier 17. The error amplifier 17 detects any change in the voltage at the output terminals of the switching regulator and provides a current whose value is determined by the change in the output voltage. The current from the error amplifier 17 causes the rate generator 15 to develop pulses having a frequency which is determined by the value of the current from the amplifier 17. Pulses from the rate generator cause the trigger generator 14 to develop trigger signals for the switching regulator. The recovery disable circuit 16 senses the time that output current is being delivered by one of the portions of the switching regulator to the output filter capacitors and prevents the rate generator from delivering pulses during the time that this current is being delivered.

The overcurrent detector 20, the over-voltage detector 21 and the under-voltage detector 22 sense any abnormal values of current or voltage at the output terminals of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

SWITCHING REGULATOR

As indicated in FIG. 1, the dual switching regulator 10 includes a pair of switching regulators, each of the pair of regulators having a pair of transformers. The first of the two regulators includes a pair of transformers 24 and 25, each having a primary winding and a secondary winding. The primary windings 28 and 29 are connected in series and are coupled to the high voltage unregulated D.C. power supply which is connected to the input terminals 49 and 50. A pair of silicon controlled rectifiers 38 and 39 control the current supplied by the unregulated D.C. power supply to the primary windings of transformers 24 and 25. The anode of silicon controlled rectifier 38 is connected to the positive terminal 49 of the unregulated D.C. power supply and the cathode of silicon controlled rectifier 38 is connected to the upper end of primary winding 28. The gate of silicon controlled rectifier 38 is connected to one lead of the trigger generator 14 which provides trigger signals to render rectifier 38 conductive. The anode of silicon controlled rectifier 39 is connected to the lower end of primary winding 29 and the cathode of silicon controlled rectifier 39 is connected to the negative terminal 50 of the unregulated D.C. power supply. A second lead from the trigger generator 14 is connected to the gate of silicon controlled rectifier 39 to provide trigger signals to render rectifier 39 conductive. The other half of the dual regulator includes transformers 26 and 27 and silicon controlled rectifiers 40 and 41.

The magnetic core employed in transformers 24–27 provides the magnetization characteristics illustrated in the magnetization curve of FIG. 3. The magnetizing force H is equal to the product of the number of turns in a winding on the transformer core and the number of amperes of current for each turn of wire divided by the length of the core. Since the physical length of a particular transformer core is constant the magnetizing force of the transformer is often expressed as the number of amperes times the number of turns, or "ampere-turns." The flux density B is a number of lines of flux per square centimeter of the transformer core and is determined by the value of magnetizing force and the type of material used in the core. A discussion of the magnetization curves can be found in the textbook "Magnetic Circuits and Transformers" by E. E. Staff, M.I.T., 1943, published by John Wiley & Sons, New York, N.Y.

The operation of one half of the dual switching regulator of FIG. 1 will now be discussed in connection with the magnetization curve shown in FIG. 3 and the waveforms shown in FIG. 4. It should be understood that the other half of the dual switching regulator operates in a similar manner. It should also be understood that additional sections of the switching regulator may be connected to the circuit shown in FIG. 1.

A pair of capacitors 44 and 45 provide predetermined quantities of electrical energy to the transformers 24 and 25 each time one of the silicon controlled rectifiers 38 and 39 is rendered conductive. Each time one of the silicon controlled rectifiers 38 and 39 is rendered nonconductive the same predetermined quantity of energy is delivered by one of the transformers 24 and 25 through diodes 52 and 53 to a filter capacitor 57. Prior to the time t1 shown in FIG. 4, capacitor 44 of FIG. 1 is charged to the polarity shown in FIG. 1. At time t1 a pulse from trigger generator 14 renders silicon controlled rectifier 38 conductive so that the voltage across capacitor 44 is supplied to the primary winding 28 of transformer 24 causing a current I1 to flow from the upper plate of capacitor 44 through anode to cathode of rectifier 38, through the primary winding 28 to the lower plate of capacitor 44.

The current I1 through primary winding 28 causes a change of flux in the transformer core and causes the operating point to move from point A toward point C of the magnetization curve in FIG. 3. This change in flux produces a voltage across primary winding 28, which limits the rate of increase in current through silicon rectifier 38, thus preventing possible damage to rectifier 38. A positive voltage applied to the upper end of primary winding 28 causes the operating point to move from point C to point D. The distance between point C and point D is proportional to the product of the voltage applied to primary winding 28 and the duration of time this voltage is applied.

The voltage applied to primary winding 28 is magnetically coupled through the transformer core to the secondary winding 33. Between time t1 and time t2 secondary winding 33 has a positive polarity of voltage at the lower end of the winding and a negative polarity of voltage at the upper end of the winding. At this time, the voltage across the secondary winding 33 causes diode 52 to be back biased so that no current flows through the diode or through the secondary winding 33. Capacitor 44 provides current I1 until this capacitor has discharged at time t2 as shown in the waveform I1 of FIG. 4. The area M under the curve of waveform K (FIG. 4) between time t1 and time t2 is the sum of the products of the voltage applied to primary winding 28 and the duration of time the voltage is applied and this area M represents the total energy stored in the core of transformer 24. When the voltage applied to primary winding 28 has a zero value at time t2 the operating point reaches point D.

At time t2, the energy stored in the core of transformer 24 reverses the polarity of voltage across each of the transformer windings so that a negative polarity of voltage is developed at the upper end of primary winding 28. This negative polarity of voltage at the upper end of primary winding 28 causes the operating point in FIG. 3 to move from point D toward point E and to begin moving toward point A. Again the distance between point E and point A is proportional to the products of the voltage across primary winding 28 and the duration of time this voltage is applied. The area N under the curve of waveform K between times t2 and t9 is the sum of the products of the voltage across primary 28 and the time this voltage is applied. This area N represents a total energy which the core of transformer point 24 returns through the transformer. The voltage across primary winding 28 causes current I1 to charge capacitor 44 to a polarity opposite to the polarity shown in FIG. 1.

The energy in the core of transformer 24 causes the voltage across secondary winding 33 to increase to a value larger than the voltage across filter capacitor 57 so that a current I3 flows through diode 52 to charge capacitor 57. The energy which is stored in the core of transformer 24 when silicon controlled rectifier 38 conducts is proportional to the difference between the flux at point A and point D on the magnetization curve of FIG. 3; and the energy which is transferred to the secondary winding 33 when silicon controlled rectifier 38 is rendered nonconductive, is proportional to the difference between the flux at point D and point A. Since the distance between point A through point C to point D shown in FIG. 3 is substantially the same as the distance between point D through point E to point A substantially all the energy which was stored in the core of the transformer between times t1 and t2 is returned and stored on capacitors 57 and 58. Capacitor 44 delivers substantially the same amount of energy to the transformer each time the silicon controlled rectifier 38 is rendered conductive so that the amount of energy delivered to capacitors 57 and the voltage across these capacitors is determined by the frequency of signals applied to the gate of rectifier 38. Capacitor 45 also provides a predetermined quantity of energy to transformer 25 each time silicon controlled rectifier 39 is rendered conductive. Capacitors 46 and 47 provide predetermined quantities of energy to transformers 26 and 27 each time that the silicon controlled rectifiers 40 and 41 respectively are rendered conductive.

Prior to time *t*6, capacitor 45 is charged to the polarity shown in FIG. 1. At time *t*6 a pulse from the trigger generator 14 renders silicon controlled rectifier 39 conductive so that current I2 flows from the upper plate of capacitor 45 through the primary winding 29, from anode to cathode of rectifier 39 to the lower plate of capacitor 45. Current I2 through the primary winding and the voltage impressed across this winding cause the operating point of the characteristic curve in FIG. 3 to move from point A through point C to point D and cause a predetermined quantity of energy to be stored in the core of transformer 25. When silicon controlled rectifier 39 is rendered nonconductive, this energy is transferred through the secondary winding 34 causing a current I4 to charge capacitor 57 as described above.

The amount of voltage across capacitors 57 and 58 can be controlled by controlling the frequency of the trigger signals which trigger generator 14 applies to the gates of the silicon controlled rectifiers 38–41. The frequency of the trigger signals is determined by the value of the current applied to the rate generator 15. When an increase in the amount of current drawn by a load (not shown) connected across the output terminals 64 and 65 in FIG. 1 causes the value of the output voltage to fall below a predetermined reference level, the frequency of the signals from trigger generator 14 increases. This increase in the frequency of the output signals causes an increase in the rate of energy delivered to capacitors 57 and 58 and increases the voltage between output terminal 64 and 65 to the predetermined reference level. The voltage at the output terminal 64 of the power supply controls the frequency of the signals from trigger generator 14 so that the voltage at the output terminals 64 and 65 is substantially constant even when the current drawn from this power supply varies over a wide range of values.

SEQUENCER

The sequencer shown in FIG. 2 comprises a counter and trigger generator 14, a rate generator 15, and a recovery disable circuit 16. The rate generator 15 generates a series of pulses having a frequency which is determined by the value of current supplied from the error amplifier 17 shown in FIG. 1. These pulses are applied to the counter and trigger generator 14 causing the generator to sequentially provide trigger pulses to the output leads 106–109 as shown in waveforms F-J of FIG. 4. These trigger pulses are coupled to the gates of the silicon controlled rectifiers 38–41 of FIG. 1.

The rate generator 15 includes a variable current source 67 having an input terminal 63 and a pair of transistors 72 and 73. The current supplied to signal input terminal 63 is determined by the value of voltage at the output terminal 64 of the switching regulator shown in FIG. 1. When the value of voltage at the output terminal 64 is high the error amplifier 17 of FIG. 1 supplies a low value of current to the signal input terminal 63 so that current through transistor 72 and transistor 73 is low thereby charging capacitor 74 at a relatively low rate. This low rate of charge on capacitor 74 causes the rate generator 15 to produce pulses having a low frequency. The low frequency of pulses from the rate generator 15 causes the counter and trigger generator 14 to provide a low frequency of trigger pulses to output terminals 106–109. The low frequency of trigger pulses at output terminals 106–109 causes the silicon controlled rectifiers 38–41 to fire at a low rate thereby providing a relatively low current from the switching regulator 10 shown in FIG. 1. When the voltage on the output terminal 64 of FIG. 1 decreases the error amplifier provides a larger value of current to the terminal 63 of the current source 67. The higher value of current to input terminal 63 causes relatively large values of current to flow from base to emitter of transistor 73 so that a relatively large value of current flows from the +12 volt source through resistor 68, transistor 72 and resistor 70 to ground. The relatively large current through resistor 68 produces a relatively large voltage drop of the polarity shown causing the base of transistor 73 to have a relatively low value so that a relatively large current flows from the +12 volts through resistor 69, from the emitter of transistor 69 to the base through transistor 72 and resistor 70 to ground. This relatively large value of current from emitter to base of transistor 73 causes a relatively large value of current to flow from the +12 volt source through resistor 69, from emitter to collector of transistor 73 to the upper plate of capacitor 74 thereby charging capacitor 74 at a relatively high rate.

Figure 5A:
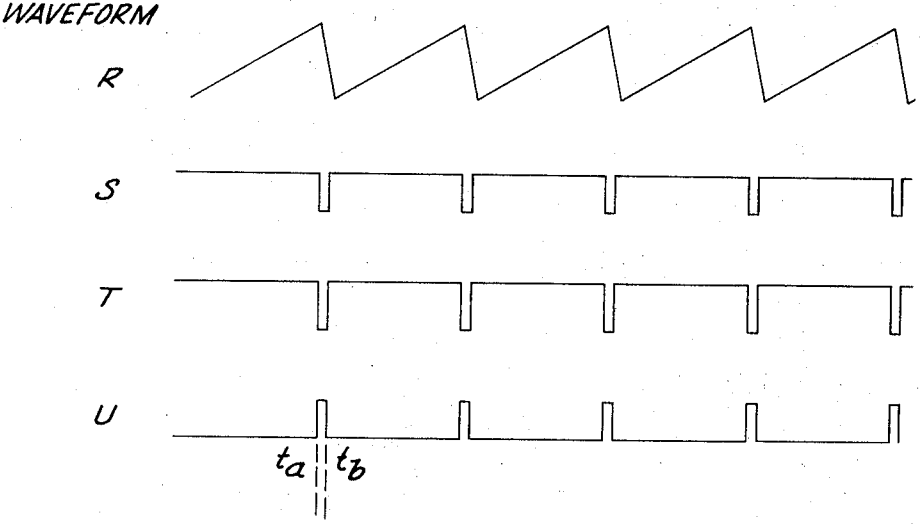

The current flowing through transistor 73 causes capacitor 74 to charge at a linear rate as shown in waveform R of FIG. 5a. The voltage waveform across capacitor 74 is amplified by transistors 79 and 80 and applied to the input lead of the Schmidt trigger circuit 89. The Schmidt trigger circuit is a circuit operable in either of two states and includes a signal input lead and a signal output lead. The operating state of the Schmidt trigger depends upon the amplitude of the signal applied to the signal input lead. That is, the Schmidt trigger circuit operates in a first state as long as a trigger signal greater than a threshold value is applied to the signal input terminal. When no trigger signal is applied or when a signal less than a threshold value is applied to the signal input lead, the Schmidt trigger circuit operates in a second state. When the Schmidt trigger circuit operates in the first state a low value of voltage is supplied to the output lead. When the Schmidt trigger circuit operates in the second state a relatively high positive value of voltage is supplied to the output lead of the Schmidt trigger circuit.

When the current through resistor 90 reaches an amplitude so that the voltage across resistor 90 is greater than the threshold value required to cause the Schmidt trigger to operate in the first state the voltage at the output lead of the Schmidt trigger 89 decreases as shown at time *ta* in waveform S of FIG. 5a. When the voltage on the lower lead of OR-gate 85 has a low value, the voltage on the upper input lead of OR-gate 85 causes gate 85 to provide a low value of voltage on the output lead as shown in waveform T of FIG. 5a. This low value of voltage at the output lead of OR-gate 85 causes a current to flow from the upper plate of capacitor 74 through diode 76 and resistor 82 to the output lead of the OR-gate 85 thereby causing capacitor 74 to rapidly discharge as shown between times *ta* and

*tb* in waveform R of FIG. 5*a*. The low value of voltage from the output lead of OR-gate 85 is applied to the input lead of inverter 88 causing inverter 88 to provide a positive pulse as shown in waveform U of FIG. 5*a*. An inverter provides the logical operation of inversion for input signal applied thereto. The inverter provides a positive output signal representing a binary one when the input signal applied thereto is a low value representing a binary zero. Conversely, the inverter provides an output signal representing a binary zero when the input signal represents a binary one. Each of the timing pulses from the output lead of inverter 85 are applied to the signal input lead of the counter and trigger generator 14 causing one of the master-slave flip-flops 96 and 97 to change states, thereby providing a signal pulse at one of the output leads 106–109.

OR-gate 84 provides a latch for the circuit and prevents noise voltages on the lower input lead of gate 85 from distorting the voltage of waveform T. Once the voltage at the output lead of gate 85 drops (for example, at time ta) this low value of voltage on the upper input lead of gate 84 and the low value of voltage on the lower input lead of gate 84 hold the voltage on the output lead of gate 84 low. A varying voltage on the lower input lead of gate 85 can not cause this voltage of waveform T to change. The voltage of waveform T can increase only by changing the voltage of waveform S as shown at time tb.

The master-slave flip-flop 24 of FIG. 2 includes a J input lead, a K input lead, a C or clock input lead and a Q and a $\bar{Q}$ output lead. The master-slave flip-flop may also have a "SD" and "RD" input lead. In this type of device a binary one applied to the J lead and a positive voltage applied to the C lead places the flip-flop into its set state in which the binary one is stored in the flip-flop without changing the voltage on the output leads. When the voltage on the C lead decreases the binary one is transferred to the Q output lead and a binary zero to the $\bar{Q}$ lead. Conversely, when a binary one is applied to the K input lead and the positive voltage applied to the C input lead this places the flip-flop in its reset state in which a binary zero is stored in the flip-flop without changing the voltage on the output leads. When the voltage at the C input lead decreases a binary one is provided to the $\bar{Q}$ output lead and a binary zero at the Q output lead. A negative voltage applied to the SD lead of the flip-flop sets the flip-flop irrespective of the voltages applied to the J and K input leads. A negative voltage applied to the RD input lead resets the master-slave flip-flop irrespective of any voltages applied to the J and K input leads. The master-slave flip-flops as shown in FIG. 2 are commonly available from several sources. One such master-slave flip-flop which may be used is a 7473 manufactured by Fairchild and described in the booklet "Fairchild Semiconductor" by Fairchild Semiconductor Corporation, Mountain View, California.

Prior to time t1 of FIG. 4 the voltages of $\bar{B}$ and $\bar{C}$ of flip-flops 96 and 97 are positive. At time t1 a pulse on the C input lead of flip-flop 96 and the voltage from the $\bar{C}$ lead cause flip-flop 96 to be set. When flip-flop 96 is set a positive going voltage on the B lead produces a positive pulse on output lead 106. This positive pulse on output lead 106 is coupled to the gate of silicon controlled rectifier 38 (FIG. 1) thereby rendering rectifier 38 conductive. The next timing pulse from inverter 88 on the C input lead of flip-flop 97 and the positive voltage from the B output lead of the flip-flop 96 cause flip-flop 96 to be set. When flip-flop 97 is set a positive voltage from the Q output lead is coupled through capacitor 102 to provide a positive pulse on the output lead 108. This positive pulse on output lead 108 is coupled to the gate of silicon controlled rectifier 40 (FIG. 1) thereby rendering silicon controlled rectifier 40 conductive.

At time *t6* a positive pulse from the inverter 88 and the positive voltage from the C lead of the master-slave flip-flop 97 cause the master-slave flip-flop 96 to be reset. When flip-flop 96 is reset a positive voltage from the $\bar{Q}$ output lead of flip-flop 96 is coupled through capacitor 101 to provide a positive pulse on the output lead 107. The one-shot 92 of FIG. 2 provides a minimum time duration between the timing pulses on the input lead of the counter and generator 14 and prevents two silicon controlled rectifiers in FIG. 1 from conducting at the same time. If two silicon controlled rectifiers were to conduct at the same time this could cause damage to the silicon controlled rectifiers of the switching regulator. The one-shot 92 is a circuit similar to the flip-flop differing only in that it operates in one stable state rather than two. It transfers from its reset state in which it normally operates to its set state upon the application of a trigger signal thereto. In its set state, the one-shot represents the binary one (1-state) and in the reset state, the binary zero (0-state). The lead entering the left-hand side of the one-shot symbol shown in FIG. 2 provides the set input signal. When the set input signal goes positive, the one-shot is transferred to its 1-state and stays in this set state for a predetermined period of time depending upon the time rating of the 1-shot. At the end of this predetermined time the one-shot automatically returns to its stable state (i.e., its reset state). The period of time the one-shot remains in its set state can be controlled by the selection of electronic components used to build a one-shot.

When the circuit is closed, the duration of the one-shot 92 allows the capacitors 44–47 to discharge through one of the silicon controlled rectifiers 38–41 so that the corresponding rectifier is rendered nonconductive before another rectifier is rendered conductive. A positive pulse applied to the input of one-shot 92 causes a positive voltage on the output lead of the one-shot thereby causing OR-gate 86 to couple a positive volt to the input lead of OR-gate 85. This positive voltage on the lower input lead of OR-gate 85 causes OR-gate 85 to have the positive voltage so that capacitor 74 will not discharge and will not provide a positive timing pulse to be generated by the rate generator 15.

Figure 5B:
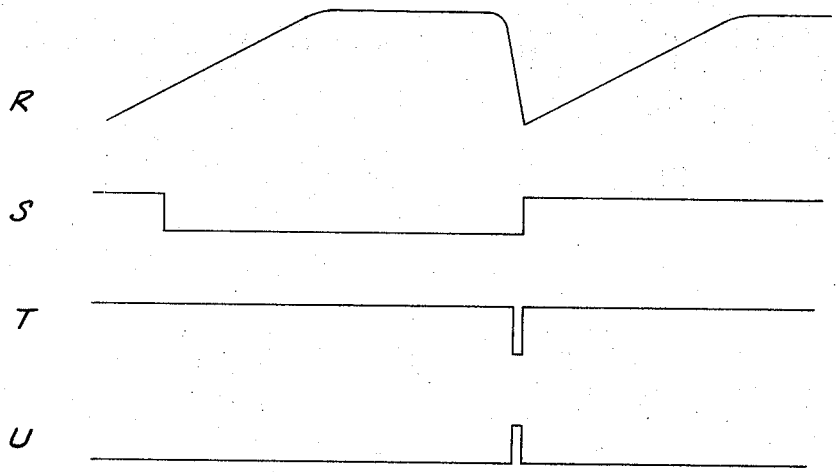

Signals from the master-slave flip-flops 96 and 97 and from the secondary winding of transformer 24 are also used to aid in providing a minimum time duration between timing pulses from the rate generator. In order for a pulse to be developed at time t4, for example, the voltage B must be positive which means that flip-flop 96 must be set or the C voltage from flip-flop 97 must be positive which means that flip-flop 97 must be set, or the voltage from the secondary winding 33 of transformer 24 must be low. If the $\bar{B}$ and the $\bar{C}$ voltages are positive and the voltage from the second winding of transformer 24 are positive the voltages to the three input leads of AND-gate 94 are positive, thereby providing a positive voltage to the lower input lead of OR-gate 86. The positive voltage on a lead of OR-gate 86 causes gate 86 to provide a positive voltage to lower lead of OR-gate 85 thereby providing a positive voltage at the output of gate 85 and preventing the generation of a timing pulse. The capacitor 74 charges to approximately +12 volts and remains at this value as shown in waveform R of FIG. 5b.

In some circuits it may be desired that only the signal from the secondary winding of transformer be connected directly to the lower input lead of gate 86. Gate 94 may be omitted from the circuit of FIG. 2.

While the principles of the invention have now been made clear in an illustrative embodiment, there will be many obvious modifications of the structure, proportions, materials and components without departing from those principles. The appended claims are intended to cover any such modifications.

I claim:

1. A sequencer for a switching regulator including a transformer having a primary winding and a secondary winding, said sequencer comprising:
   a source of current having a control lead and an output lead;
   a reference potential;
   a capacitor, said capacitor being connected between said potential and said output lead of said source of current;
   a Schmidt trigger circuit having an input lead and an output lead, said input lead of said trigger circuit being coupled to said output lead of said source of current;
   a first OR-gate having an output lead and first and second input leads, said first input lead of said first OR-gate being connected to said output lead of said trigger circuit, said second input lead of said first OR-gate being coupled to said secondary winding of said transformer;
   a diode, said diode being connected between said output lead of said source of current and said output lead of said first OR-gate; and
   a sequencer output lead, said sequencer output lead being coupled to said output lead of said first OR-gate.

2. A sequencer for a switching regulator as defined in claim 1 including:
   a second OR-gate having an output lead and first and second input leads, said output lead of said second OR-gate being connected to said second input lead of said first OR-gate, said secondary winding of said transformer being coupled to said second input lead of said second OR-gate; and
   a one-shot having an input lead and an output lead, said input lead of said one-shot being connected to said sequencer output lead, said output lead of said one-shot being connected to said first input lead of said second OR-gate.

3. A sequencer for a switching regulator as defined in claim 1 including:
   a third OR-gate having an output lead and first and second input leads, said output lead of said OR-gate being connected to said output lead of said first OR-gate, said first input lead of said third OR-gate being connected to said output lead of said first OR-gate, said second input lead of said third OR-gate being connected to said first input lead of said first OR-gate.

4. A sequencer for a switching regulator as defined in claim 1 including:
   second and third OR-gates each having an output lead and first and second input leads, said output lead of said second OR-gate being connected to said second input lead of said first OR-gate, said secondary winding of said transformer being coupled to said second input lead of said second OR-gate, said output lead of said third OR-gate being connected to said output lead of said first OR-gate, said first input lead of said third OR-gate being connected to said output lead of said first OR-gate, said second input lead of said third OR-gate being connected to said first input lead of said first OR-gate; and
   a one-shot having an input lead and an output lead, said input lead of said one-shot being connected to said sequencer output lead, said output lead of said one-shot being connected to said first input lead of said second OR-gate.

5. A sequencer for a multiple switching regulator having a plurality of silicon controlled rectifiers and a plurality of transformers each having a primary winding and a secondary winding, said sequencer comprising:
   first and second master-slave flip-flops each having first, second and third input leads and first and second output leads, said first output lead of said first flip-flop being connected to said first input lead of said second flip-flop, said second output lead of said first flip-flop being connected to said third lead of said second flip-flop, said first output lead of said second flip-flop being connected to said third input lead of said first flip-flop, said second output lead of said second flip-flop being connected to said first input lead of said first flip-flop;
   a source of current having a control lead and an output lead;
   a reference potential;
   a signal-input terminal, said input terminal being connected to said control lead of said source of current;
   a capacitor, said capacitor being connected between said output lead of said source of current and said reference potential;
   a Schmidt trigger circuit having an input lead and an output, said input lead of said trigger circuit being coupled to said output lead of said source of current;
   a first OR-gate having an output lead and first and second input leads, said first input lead of said first OR-gate being connected to said output lead of said trigger circuit;
   a diode, said diode being connected between said output lead of said source of current and said output lead of said first OR-gate, said output lead of said first OR-gate being coupled to said second input leads of said first and said second flip-flops; and
   an AND-gate having an output lead and first, second and third input leads, said output lead of said AND-gate being coupled to said second input lead of said first OR-gate, said first input lead of said AND-gate being connected to said second output lead of said first flip-flop, said second input lead of said AND-gate being connected to said second output lead of said second flip-flop, said third input lead of said AND-gate being coupled to said secondary winding of a first transformer.

6. A sequencer for a multiple switching regulator as defined in claim 5 including:
   a second OR-gate having an output lead and first and second input leads, said output lead of said second OR-gate being connected to said second input lead of said first OR-gate, said second input lead of said second OR-gate being connected to said output lead of said AND-gate; and
   a one-shot having an input lead and an output lead, said input lead of said one-shot being connected to said second input lead of said first flip-flop, said output lead of said one-shot being connected to said first input lead of said second OR-gate.

7. A sequencer for a multiple switching regulator as defined in claim 5 including:
   a third OR-gate having an output lead and first and second input leads, said output lead of said third OR-gate being connected to said output lead of said first OR-gate, said first input lead of said third OR-gate being connected to said output lead of said first OR-gate, said second input lead of said third OR-gate being connected to said first input lead of said first OR-gate.

8. A sequencer for a multiple switching regulator as defined in claim 5 including:
   second and third OR-gates each having an output lead and first and second input leads, said output lead of said second OR-gate being connected to said second input lead of said first OR-gate, said second input lead of said second OR-gate being connected to said output lead of said AND-gate, said output lead of said third OR-gate being connected to said output lead of said first OR-gate, said first input lead of said third OR-gate connected to said output lead of said first OR-gate, said second input lead of said third OR-gate being connected to said first input lead of said first OR-gate; and
   a one-shot having an input lead and an output lead, said input lead of said one-shot being connected to said second input lead of said first flip-flop, said output lead of said one-shot being connected to said first input lead of said second OR-gate.

* * * * *